(12) United States Patent
Hansen

(10) Patent No.: US 11,196,965 B2
(45) Date of Patent: Dec. 7, 2021

(54) IMAGE ARTIFACT MITIGATION IN SCANNERS FOR ENTRY CONTROL SYSTEMS

(71) Applicant: Gatekeeper Security, Inc., Sterling, VA (US)

(72) Inventor: Marc Hansen, Hamilton, NJ (US)

(73) Assignee: Gatekeeper Security, Inc., Sterling, VA (US)

( * ) Notice: Subject to any disclaimer, the term of this patent is extended or adjusted under 35 U.S.C. 154(b) by 0 days.

(21) Appl. No.: 16/808,725

(22) Filed: Mar. 4, 2020

(65) Prior Publication Data

US 2021/0127089 A1 Apr. 29, 2021

Related U.S. Application Data

(60) Provisional application No. 62/925,892, filed on Oct. 25, 2019.

(51) Int. Cl.
*H04N 7/18* (2006.01)
*G06T 5/20* (2006.01)
*H04N 5/225* (2006.01)

(52) U.S. Cl.
CPC ............... *H04N 7/18* (2013.01); *G06T 5/20* (2013.01); *H04N 5/2253* (2013.01); *H04N 5/2254* (2013.01); *H04N 5/2256* (2013.01)

(58) Field of Classification Search
CPC ........................................... H04N 7/18
See application file for complete search history.

(56) References Cited

U.S. PATENT DOCUMENTS

| 7,349,007 | B2 | 3/2008 | Millar | |
| 9,953,210 | B1 * | 4/2018 | Rozploch | G07C 9/253 |
| 2012/0140079 | A1 * | 6/2012 | Millar | G06K 9/00577 |
| | | | | 348/148 |

* cited by examiner

*Primary Examiner* — Md N Haque
(74) *Attorney, Agent, or Firm* — Locke Lord LLP; Joshua L. Jones; Gabrielle Gelozin

(57) ABSTRACT

A method for imaging includes illuminating a vehicle undercarriage with illumination in an atmospheric absorption band, imaging the vehicle undercarriage to form an image, wherein scanning includes filtering out illumination returned from the vehicle undercarriage that is outside the atmospheric absorption band. The method includes forming an image with the filtered illumination returned from the vehicle undercarriage.

18 Claims, 6 Drawing Sheets

IMAGE ARTIFACT MITIGATION IN SCANNERS FOR ENTRY CONTROL SYSTEMS

CROSS-REFERENCE TO RELATED APPLICATIONS

This application claims priority to U.S. Provisional Patent Application No. 62/925,892 filed Oct. 25, 2019 the contents of which are incorporated by reference herein in their entirety.

BACKGROUND

1. Field

The present disclosure relates to imaging, and more particularly to scanners for entry control systems, such as under car scanners for security check points.

2. Description of Related Art

Several technologies exist which can scan the underside of motor vehicles. Many of these technologies rely on the ability to link a vehicle with a vehicle identifier (e.g., license plate number, radio frequency identification (RFID) tag, etc.) so as to be able to perform an automated search of the underside. Other technologies produce only a single image requiring manual inspection of the vehicle image on a screen. One issue that arises is artifacts in the images, wherein areas within a given image have lower image quality. Such artifacts can interfere with software performing analysis on the images, e.g., giving rise to false positives on potential security issues, and can even hamper manual inspection of the vehicle images on screen.

The conventional techniques have been considered satisfactory for their intended purpose. However, there is an ever present need for improved systems and methods for imaging systems and methods. This disclosure provides a solution for this need.

SUMMARY

A scanner system includes a scanner framework having a front end, a back end and a top surface. A scanner camera is operatively connected to the scanner framework and has a lens and a sensor for recording images captured from a field of view of the camera. A first mirror arrangement is secured to the framework so as to provide a first reflecting surface angled upwardly toward the top surface and toward the framework front end for imaging a second portion of the field of view. A second mirror arrangement is secured to the framework so as to provide a second reflecting surface angled upwardly in a direction facing the framework top surface and the framework back end for imaging a first portion of the field of view. An illuminator is operatively connected to the camera to illuminate the first and second portions of the field of view. A band pass filter is operatively connected to the scanner camera to filter out illumination outside of an atmospheric absorption band, wherein the sensor is sensitive to illumination in the atmospheric absorption band.

The filter can be configured to pass illumination within plus or minus 60 nm of at least one atmospheric absorption band selected from the list consisting of 780 nm, 940 nm, 1120 nm, 1400 nm, and 1900 nm. The filter can be configured to pass illumination within plus or minus 50 nm of at least one atmospheric absorption band selected from the list consisting of 780 nm, 940 nm, 1120 nm, 1400 nm, and 1900 nm. The illuminator can be configured to illuminate a scene with illumination in the at least one atmospheric absorption band selected from the list consisting of 780 nm, 940 nm, 1120 nm, 1400 nm, and 1900 nm. The sensor can include at least one of Germanium sensitive to plus or minus 50 nm of 1120 nanometers, InGaAs sensitive to plus or minus 50 nm of 780 nm to 1900 nm, and/or HgCdTe (Mercury Cadmium Telurride or Mercadetelluride). The illuminator can be an LED or laser based illuminator that emits 940 nm illumination, wherein the filter is configured to pass illumination within plus or minus 50 nm of 940 nm, and wherein the sensor is a silicon based sensor sensitive to illumination within plus or minus 50 nm of 940 nm.

The scanner camera can be secured to the framework such that the lens faces the framework front end. The first mirror arrangement can include a mirror mounted at or near the framework front end. The second mirror arrangement can include a primary mirror mounted at or near the framework back end, and a secondary mirror mounted at or near a location between the framework front and back ends. The scanner camera can be secured to the framework such that a portion of the lens faces the first mirror arrangement and a portion of the lens faces the second mirror arrangement. The first mirror arrangement can includes a mirror mounted at or near the framework front end and the second mirror arrangement can include a primary mirror mounted at or near the framework back end and a secondary mirror mounted at or near a location between the framework front and back ends.

The scanner camera can be secured such that the camera lens is angled downwardly away from the framework top surface. The scanner camera can be secured to the framework such that the lens faces the framework back end. The framework can include a first glass member secured between the framework top surface and front end, and a second glass member secured between the framework top surface and back end. The first reflecting surface can be angled toward the first glass member and the second reflecting surface can be angled toward the second glass member. The camera can be provided with a single board computer (SBC) in two-way communication with a remote computer monitoring system.

A method for imaging includes illuminating a vehicle undercarriage with illumination in an atmospheric absorption band, imaging the vehicle undercarriage to form an image, wherein scanning includes filtering out illumination returned from the vehicle undercarriage that is outside the atmospheric absorption band. The method includes forming an image with the filtered illumination returned from the vehicle undercarriage.

Illuminating can include illuminating the undercarriage with illumination that includes at least one atmospheric absorption band selected from the list consisting of 780 nm, 940 nm, 1120 nm, 1400 nm, and 1900 nm. Filtering out illumination can include filtering out illumination that is not within plus or minus 50 nm of at least one band selected from the list consisting of 780 nm, 940 nm, 1120 nm, 1400 nm, and 1900 nm. The illuminator can be an LED or laser based illuminator that emits at least one of 780 nm and/or 940 nm illumination, and wherein the filter is configured to pass illumination within plus or minus 50 nm of at least one of 780 nm and/or 940 nm, and wherein the sensor is a silicon based sensor sensitive to illumination within plus or minus 50 nm of at least one of 780 nm and/or 940 nm.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
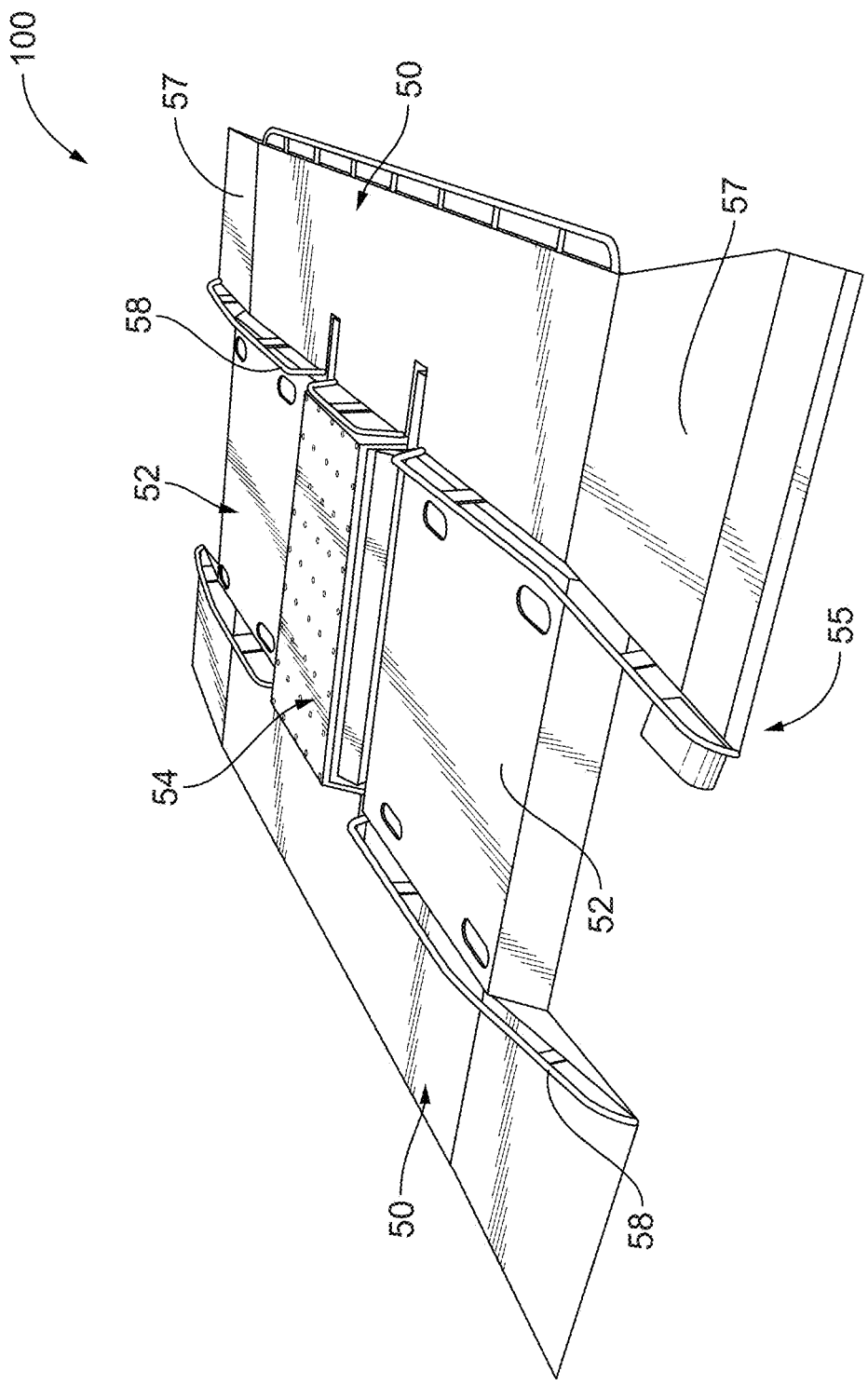
FIG. 1 is a perspective view of an embodiment of a system constructed in accordance with the present disclosure, showing the mobile platform including the scanner system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 54. Other embodiments of systems in accordance with the disclosure, or aspects thereof, are provided in FIGS. 2-6, as will be described. The systems and methods described herein can be used to improve image quality by removing imaging artifacts, e.g. artifacts imposed by the sun in the background of an undercarriage image.

Figure 2:
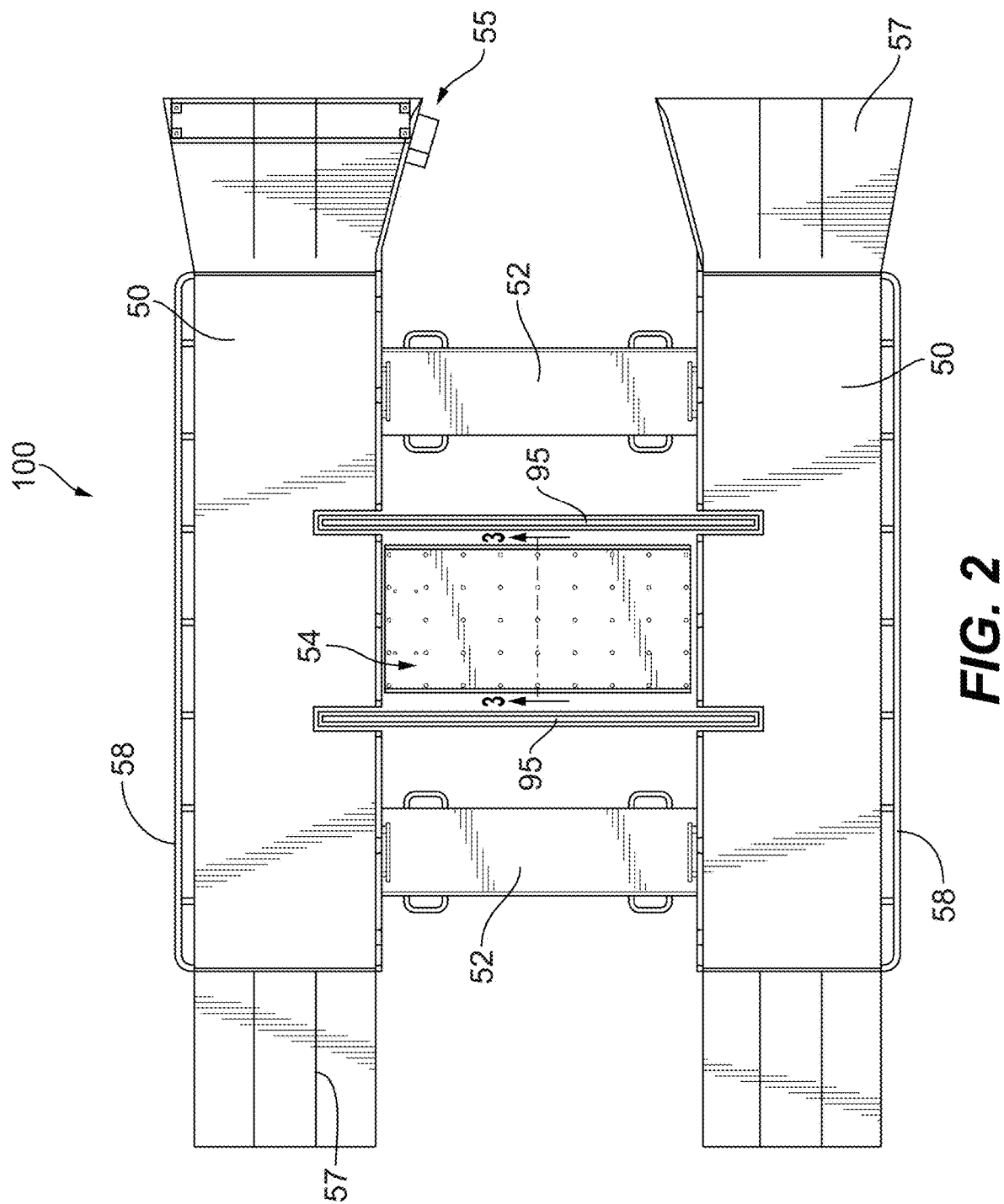
FIG. 2 is a top plan view of the system of FIG. 1, showing where the cross-section for FIG. 3 is taken.

As shown in FIGS. 1-2, the mobile platform 100 includes the following elements: a pair of platform runners 50, two cross members 52 connecting between the platform runners, a scanner system 54 between the two cross members 52, a proximity sensor 55 operatively connected to trigger under vehicle scanning by the scanner system 54, and a front camera (not shown). The platform runners 50 and cross members 52 may not be required, as the scanner system 54 can be embedded in the ground underneath any vehicle which may pass over. In the mobile platform as shown in FIGS. 1-2, the scanner system 54 is positioned between the two platform runners 50 and is maintained so as to avoid vibration and other negative consequences. The platform runners 50 can have lead on and off ramps 57 for ramping a vehicle on an off of the platform runners 50. On the leading edge of one of the runners (e.g., the right hand runner), a proximity sensor 55 can be provided. The sensor is activated by a pressure switch contained within a thick rubber strip, similar to those used at car washes, for example. Guide rails 58 can also be provided to keep the vehicle profile as consistent as possible. It will be appreciated that the runners will be maintained in substantially parallel condition to facilitate vehicles passing over them. The two cross members 52 assist in this process by linking the two runners 50 together by interlocking connections, in one embodiment. Additional details about the mobile platform are in U.S. Pat. No. 7,349,007 which is incorporated by reference herein in its entirety.

Figure 3:
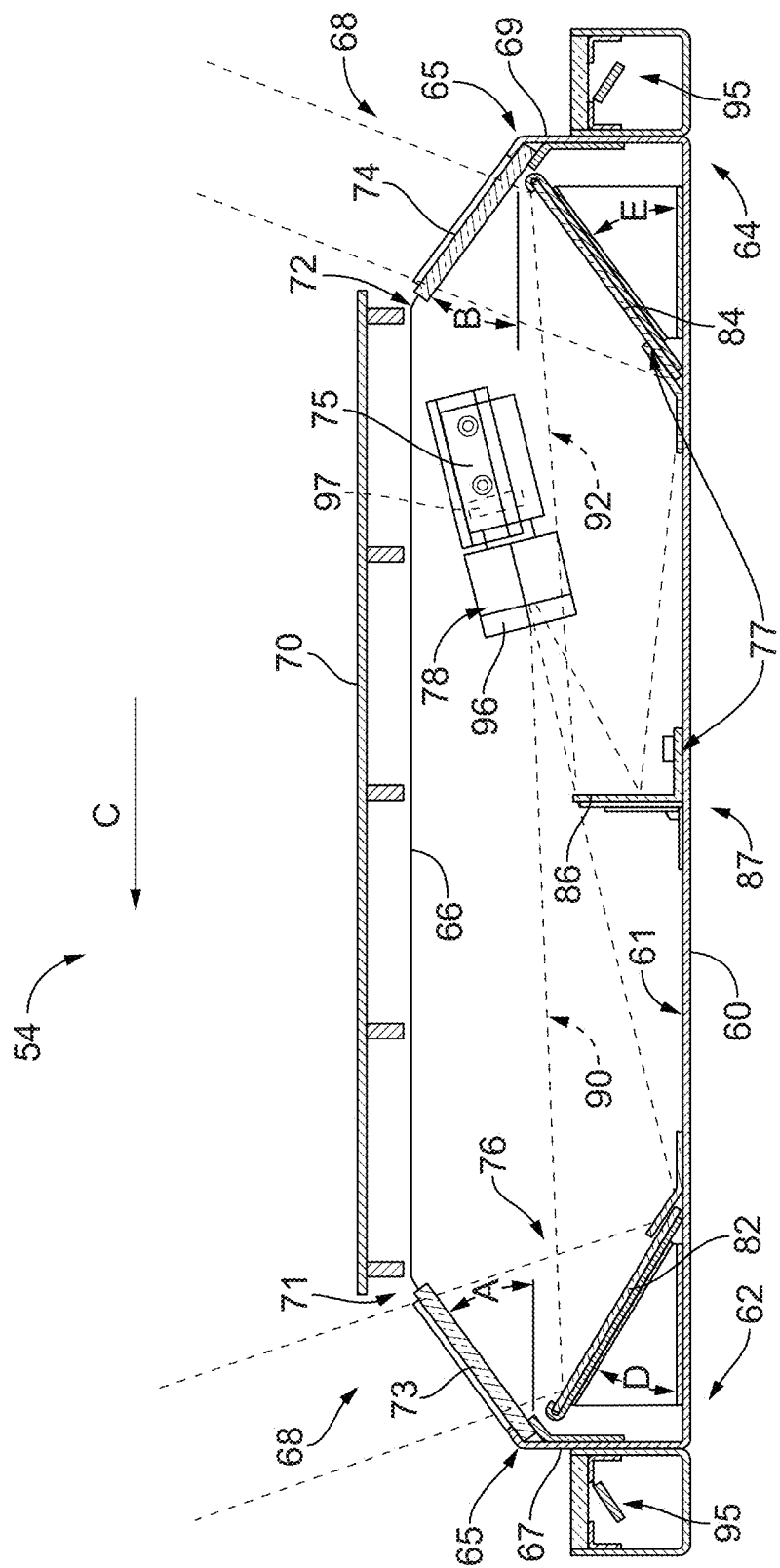
FIG. 3 is a cross-sectional side elevation view of the system of FIG. 1, showing the illuminators, camera, and filter.

With reference now to FIG. 3, the scanner system 54 includes a housing or framework 60 having a front end 62, a back end 64, a top surface 66, and openings 68 created between the top edge 65 of the front 67 and back 69 end walls and the respective side edges 71, 72 of the top surface 66. An ambient heat shield (AHS) 70 absorbs the direct heat from the sun and can be positioned above the top cover of the scanner, for example.

Two windows 73, 74 can be securely positioned between the top surface 66 and the end walls 67, 69 in order to cover the respective openings while maintaining visibility therethrough. The windows 73, 74 are secured at respective angles A and B to the horizontal. The first window 73 is positioned to face forward (i.e., in the direction of travel of the overriding vehicle) and the second window 74 is positioned to face backward (i.e., against the direction of travel of the overriding vehicle) to assist in capturing two simultaneous views of the vehicle. The direction of travel of a given vehicle is indicated by arrow C in FIG. 3.

The scanner system 54 includes a camera 75 and first 76 and second 77 internal mirror arrangements, which can be angled such that internal mirrors 82 and 84 face out through the anti-reflective, anti-glare, water-repellant glass members of the windows 73, 74. The camera 75 can be a Basler A602f wide area scan camera manufactured by Basler Vision Technology of Ahrensburg, Germany, capable of recording digital video images at a rate of at least 200 frames per second. The camera is provided with a lens 78 mounted thereto. The scanner camera 75 is secured in a position that faces the direction C of oncoming travel of a vehicle. The camera 75 is secured such that the lens 78 faces at an angle downwardly away from the framework top surface 66 such that the camera 75 is appropriately positioned to capture images reflected off of the first 76 and second 77 mirror arrangements. It is contemplated that the camera 75 can be oriented such that its lens faces either the front end or the back end of the framework.

As further shown in FIG. 3, the first mirror arrangement indicated at 76 can be secured to the framework so as to provide a first reflecting surface angled upwardly toward the framework top surface 66 and toward the framework front end 62. The positioning of the first mirror arrangement enables the camera to record images reflected by the first mirror 82 as they appear on the other side of window member 73. The first mirror arrangement includes a first mirror secured at or near the scanner framework front end.

In a similar manner, the second mirror arrangement, indicated at 77, can be secured to the framework so as to provide a second reflecting surface angled upwardly in a direction facing the framework top surface 66 and the framework back end 64. The positioning of the second mirror arrangement 77 enables the camera 75 to record images reflected by the second mirror arrangement as they appear on the other side of window member 74. The second mirror arrangement 77 can include a larger primary mirror 84 mounted at or near the framework back end 64 and a smaller secondary mirror 86 mounted at a location 87 in between the front 62 and back 64 ends of the scanner framework. The primary mirror 84 of the second mirror arrangement 77 is secured inside the back wall 64 of the framework and underneath the back window member 74. The secondary mirror 86 of the second mirror arrangement 77 can be positioned roughly halfway between the scanner framework front 62 and end 64 walls, and can be secured in a substantially perpendicular relation to the framework bottom floor 61. The mirror 82 can be secured at an angle D of between approximately 20 and 30 degrees from the horizontal, and mirror 84 is secured at an angle E of between approximately 25 and 35 degrees from the horizontal.

The scanner system 54 including the camera 75 and first and second mirror arrangements 76, 77 allows the scanner system 54 to operate such that the camera 75 can detect multiple images from an overriding vehicle at the same time. The top half of the camera lens looks over the small mirror 86 on to the front mirror 82. The bottom half of the camera lens looks onto the small mirror 86 that captures the view reflected by the back main mirror 84. A first view is taken of the vehicle as it approaches wall 69 as shown by the dashed lines 92. In this view, the camera is recording the image of the vehicle as reflected by the back mirror 84 at the back end of the scanner framework looking toward the back of the vehicle via the smaller mirror 86. A second view is simultaneously recorded by the camera as it is reflected from the first mirror arrangement as indicated in dashed lines at 90.

An illuminator 95, which includes an upward facing laser or LED bank on either side end of the scanner system 54, is operatively connected to the camera 95 to illuminate the first and second portions of the field of view. A band pass filter 96 is operatively connected to the scanner camera 75 to filter out illumination outside of an atmospheric absorption band, wherein the sensor 97 of the camera 75 is sensitive to illumination in the atmospheric absorption band. The filter 96 can be located outside of the lens 78 as shown, or it can be mounted between the lens 78 and the camera 75 inside the interface between the lens 78 and camera 75.

The filter 96 can be configured to pass illumination within plus or minus 50 or 60 nm of at least one atmospheric absorption band such as 780 nm, 940 nm, 1120 nm, 1400 nm, and 1900 nm. The illuminator 95 can be configured to illuminate the scene in the field of view with illumination in the at least one atmospheric absorption band such as 780 nm, 940 nm, 1120 nm, 1400 nm, and 1900 nm. Those skilled in the art will readily appreciate that there can be advantages to systems that use even smaller bandwidth spectral filters. For example, a system 54 may be able to reject even more of the solar irradiance transmitted through the atmosphere by implementing a bandpass filter as low as plus or minus 5 nm. This approach would typically require laser illumination which has a smaller spectral bandwidth than 5 nm making for an efficient system that will collect most of the laser illumination through that small spectral band. Implementing an LED solution which has tradeoffs. LEDs have a larger spectral bandwidth typically above 30 nm, and therefore a filter of larger than 30 nm is needed to make sure the system 54 captures all of the LED illumination efficiently. If a spectral filter of plus or minus 5 nm bandpass is used with LEDs, most of the light from the LEDs would be rejected by the filter. In appropriate applications, it may be desirable to implement a laser based solution with a smaller spectral bandwidth filter since there are some atmosphere absorption bands that are thinner than the 50 or 60 nm.

The sensor 97 can include at least one of Germanium sensitive to plus or minus 50 nm of 1120 nanometers (Germanium can be sensitive to the wavelengths of 700 nm to about 1600 nm. It is not typically sensitive up to 1900 nm.), InGaAs sensitive to plus or minus 50 nm of 780 nm to 1900 nm, and/or HgCdTe (Mercury Cadmium Telurride or Mercadetelluride). It is contemplated that the illuminator 95 can be an LED or laser based illuminator that emits 940 nm illumination, wherein the filter 96 is configured to pass illumination within plus or minus 50 nm of 940 nm, and wherein the sensor 97 is a silicon based sensor sensitive to illumination within plus or minus 50 nm of 940 nm. Those skilled in the art having the benefit of this disclosure will readily appreciate that the bandwidths described in this paragraph can be tailored larger or smaller as suitable for a specific application, e.g. as explained in the previous paragraph, and to account for manufacturing tolerances in illuminators or the like.

Figure 4:
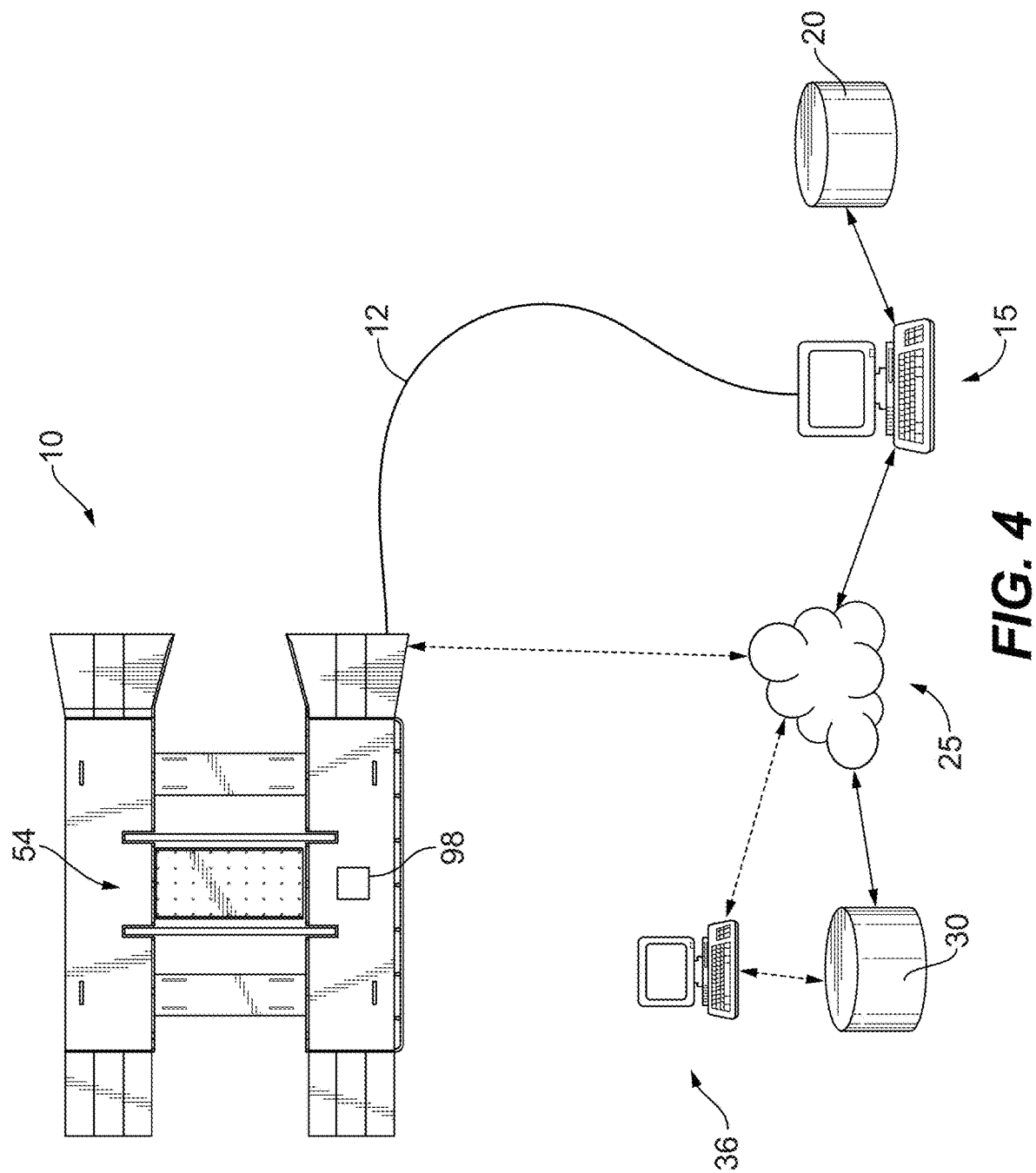
FIG. 4 is a schematic view of the system of FIG. 1, showing the connectivity of the system.

With reference now to FIG. 4, the camera 75 can be provided with a single board computer (SBC) 98 in two-way communication with a remote computer monitoring system. This can be implemented as part of an entry control system, including an entry control platform and scanner device as described above (shown generally at 10) and a computer/monitor element 15. Computer and monitor 15 can access a database 20, which can be locally stored on the computer 15 or accessible via a network. Computer 15 can also be connected to a wide area network 25 such as the Internet, for example, in order to access a different database 30. This database 30 can be used to store and update reference images for vehicles of all types, and may be used to update local database 20. Reference images can be "stock" images of vehicle undersides made available by vehicle manufacturers, dealers or service providers, for example. It is also contemplated that reference images can be images created using the systems disclosed herein. It will be appreciated that the effectiveness of the scanner system 54 can be increased when using reference images created using the systems as disclosed herein, due to the increased accuracy and comprehensive detail available.

A separate computer 35 is shown, which may be a remote computer not located near the physical entry control deployment elements 10. Thus, communications from the scanner system 54 can be used while being operated either locally at computer 15 or remotely at computer 35. It will be appreciated that computer and monitor 15 may be considered remote even when located at the implementation site, since they may be connected to elements 10 via Ethernet or fiber cabling 12, for example, or via wireless communication.

A method for can include illuminating a vehicle undercarriage with illumination in an atmospheric absorption band, imaging the vehicle undercarriage to form an image, wherein scanning includes filtering out illumination returned from the vehicle undercarriage that is outside the atmospheric absorption band. The method includes forming an image with the filtered illumination returned from the vehicle undercarriage.

Figure 5:
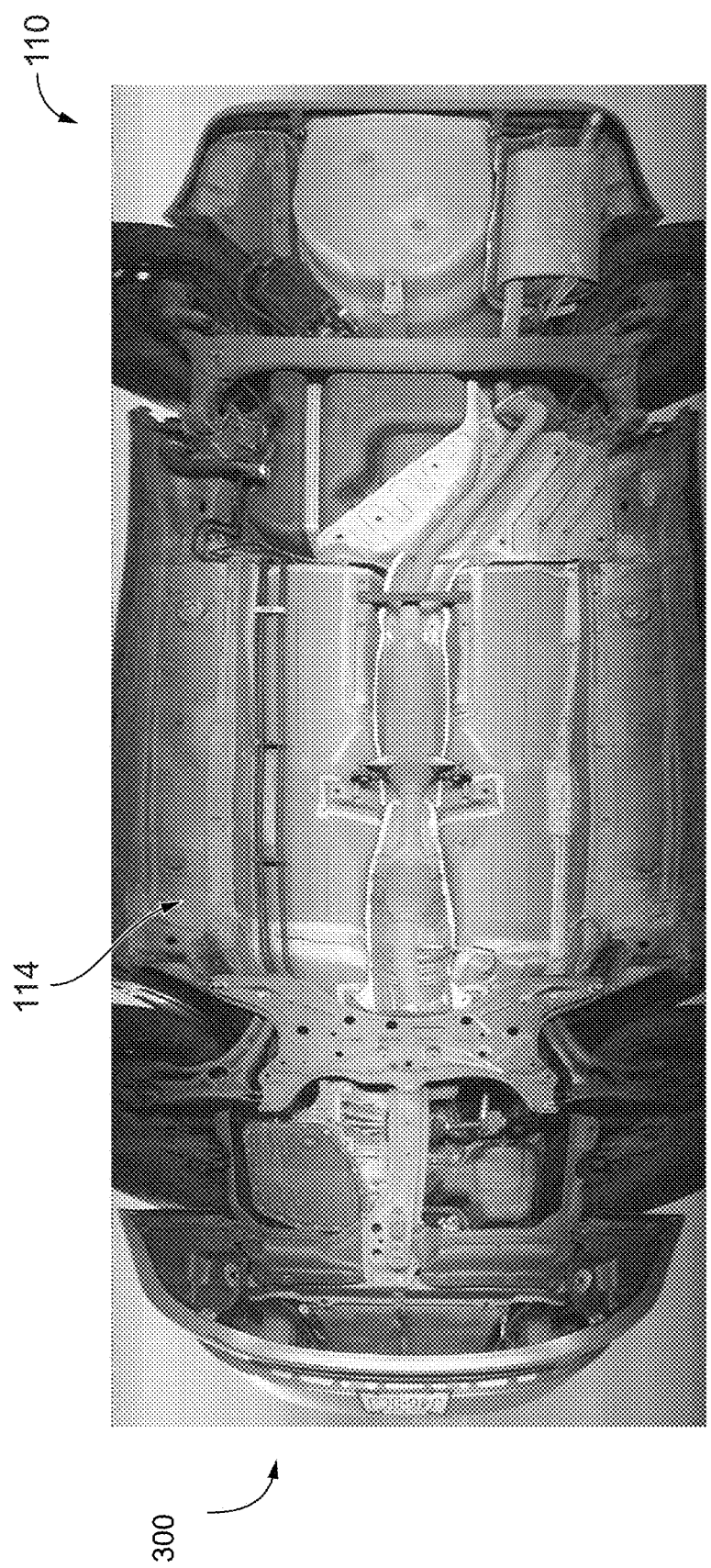
FIG. 5 is an image obtained using a system as in FIG. 1, showing the lack of artifacts.
Figure 6:
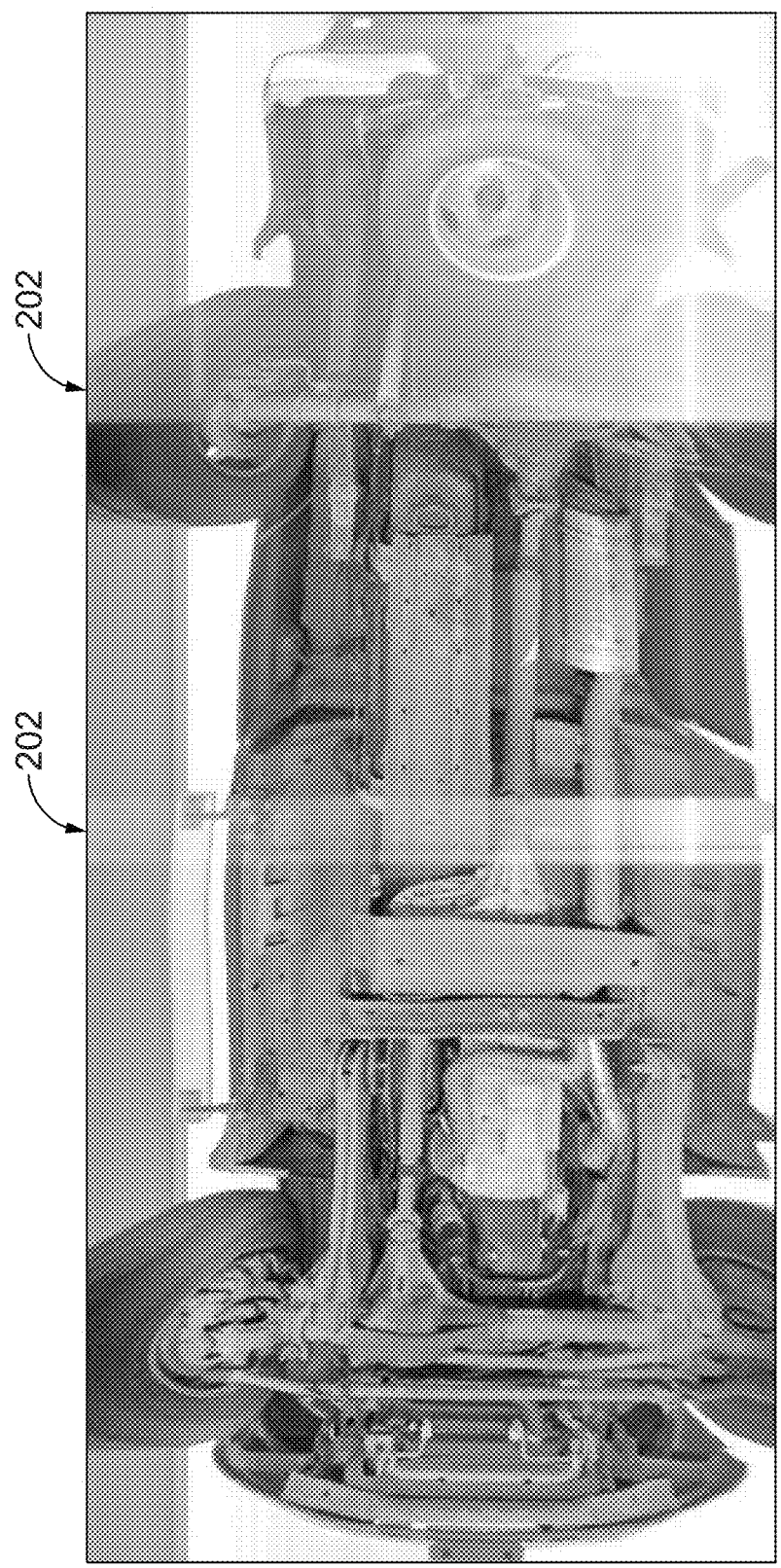
FIG. 6 is an image obtained without the systems and methods disclosed herein, showing the image artifacts.

Illuminating can include illuminating the undercarriage with illumination that includes at least one atmospheric absorption band selected from the list consisting of 780 nm, 940 nm, 1120 nm, 1400 nm, and 1900 nm. Filtering out illumination can include filtering out illumination that is not within plus or minus 50 nm of at least one band selected from the list consisting of 780 nm, 940 nm, 1120 nm, 1400 nm, and 1900 nm (or other suitable bandwidths as described above). FIG. 6 shows an under carriage image 200 formed without the benefits of systems and methods disclosed herein. The artifacts 202 are a result of the sun shining in to the scanner system during the scanning process. FIG. 5 shows an undercarriage image 300 as obtained with systems and methods disclosed herein. The artifacts 202 are eliminated, even if the sun shines into the scanner system 54 during the scanning process.

The methods and systems of the present disclosure, as described above and shown in the drawings, provide for reduction or even elimination of certain artifacts in vehicle undercarriage imagery. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A scanner system comprising:
a scanner framework having a front end, a back end and a top surface;
a scanner camera operatively connected to the scanner framework, the camera having a lens and a sensor for recording images captured from a field of view of the scanner camera;
a first mirror arrangement secured to the scanner framework so as to provide a first reflecting surface angled upwardly toward the top surface and toward the framework front end for imaging a second portion of the field of view;
a second mirror arrangement secured to the scanner framework so as to provide a second reflecting surface angled upwardly in a direction facing the scanner framework top surface and the scanner framework back end for imaging a first portion of the field of view;
an illuminator operatively connected to the scanner camera to illuminate the first and second portions of the field of view; and
a band pass filter operatively connected to the scanner camera to filter out illumination outside of an atmospheric absorption band, wherein the sensor is sensitive to illumination in the atmospheric absorption band, wherein the band pass filter is configured to pass illumination within plus or minus 60 nm of at least one atmospheric absorption band selected from the list consisting of 780 nm, 940 nm, 1120 nm, 1400 nm, and 1900 nm.

2. The system as recited in claim 1, wherein the filter is configured to pass illumination within plus or minus 50 nm of at least one atmospheric absorption band selected from the list consisting of 780 nm, 940 nm, 1120 nm, 1400 nm, and 1900 nm.

3. The system as recited in claim 1, wherein the illuminator is configured to illuminate a scene with illumination in the at least one atmospheric absorption band selected from the list consisting of 780 nm, 940 nm, 1120 nm, 1400 nm, and 1900 nm.

4. The system as recited in claim 1, wherein the sensor includes at least one of Germanium sensitive to plus or minus 50 nm of 1120 nanometers, InGaAs sensitive to plus or minus 50 nm of 780 nm to 1900 nm, and/or HgCdTe (Mercury Cadmium Telurride or Mercadetelluride).

5. The system as recited in claim 1, wherein the illuminator is an LED or laser based illuminator that emits at least one of 780 nm and/or 940 nm illumination, and wherein the filter is configured to pass illumination within plus or minus 50 nm of at least one of 780 nm and/or 940 nm, and wherein the sensor is a silicon based sensor sensitive to illumination within plus or minus 50 nm of at least one of 780 nm and/or 940 nm.

6. The system as recited in claim 1, wherein the scanner camera is secured to the framework such that the lens faces the framework front end.

7. The system as recited in claim 1, wherein the first mirror arrangement includes a mirror mounted at or near the framework front end.

8. The system as recited in claim 1, wherein the second mirror arrangement includes a primary mirror mounted at or near the framework back end, and a secondary mirror mounted at or near a location between the framework front and back ends.

9. The system as recited in claim 1, wherein the scanner camera is secured to the framework such that a portion of the lens faces the first mirror arrangement and a portion of the lens faces the second mirror arrangement.

10. The system as recited in claim 1, wherein the first mirror arrangement includes a mirror mounted at or near the framework front end and the second mirror arrangement includes a primary mirror mounted at or near the framework back end and a secondary mirror mounted at or near a location between the framework front and back ends.

11. The system as recited in claim 1, wherein the scanner camera is secured such that the camera lens is angled downwardly away from the framework top surface.

12. The system as recited in claim 1, wherein the scanner camera is secured to the framework such that the lens faces the framework back end.

13. The system as recited in claim 1, wherein the framework includes a first glass member secured between the framework top surface and front end, and a second glass member secured between the framework top surface and back end.

14. The system as recited in claim 13, wherein the first reflecting surface is angled toward the first glass member and the second reflecting surface is angled toward the second glass member.

15. The system as recited in claim 1, wherein the camera is provided with a single board computer (SBC) in two-way communication with a remote computer monitoring system.

16. A method for imaging:
illuminating a vehicle undercarriage with illumination in an atmospheric absorption band by an illuminator operatively connected to a scanner camer to illuminate a first and a second portions of a field of view;
imaging the vehicle undercarriage to form an image by the scanner camera operatively connected to a scanner framework, the scanner camera having a lens and a sensor for recording images captured from the field of view of the scanner camera, wherein the image is formed by a first mirror arrangement secured to the scanner framework so as to provide a first reflecting surface angled upwardly toward a scanner framework top surface and toward a scanner framework front end for imaging the second portion of the field of view; and a second mirror arrangement secured to the scanner framework so as to provide a second reflecting surface angled upwardly in a direction facing the scanner framework top surface and a scanner framework back end for imaging the first portion of the field of view;
wherein scanning includes filtering out illumination returned from the vehicle undercarriage that is outside the atmospheric absorption band, wherein filtering out illumination includes filtering out illumination that is not within plus or minus 60 nm of at least one band selected from the list consisting of 780 nm, 940 nm, 1120 nm, 1400 nm, and 1900 nm; and forming an image with the filtered illumination returned from the vehicle undercarriage.

17. The method as recited in claim 16, wherein illuminating includes illuminating the undercarriage with illumination that includes at least one atmospheric absorption band selected from the list consisting of 780 nm, 940 nm, 1120 nm, 1400 nm, and 1900 nm.

18. The method as recited in claim 16, wherein the sensor is sensitive to illumination within plus or minus 60 nm of 940 nm, wherein filtering includes filtering out illumination that is not within plus or minus 60 nm of 940 nm, and wherein illuminating includes illuminating the undercarriage with illumination within plus or minus 60 nm of 940 nm.

* * * * *